(12) United States Patent
Sabharwal et al.

(10) Patent No.: US 10,970,632 B2
(45) Date of Patent: *Apr. 6, 2021

(54) GENERATING A SCORE FOR A RUNBOOK OR A SCRIPT

(71) Applicant: HCL TECHNOLOGIES LIMITED, Uttar Pradesh (IN)

(72) Inventors: Navin Sabharwal, Uttar Pradesh (IN); Amit Agrawal, Uttar Pradesh (IN)

(73) Assignee: HCL TECHNOLOGIES LTD, Uttar Pradesh (IN)

( * ) Notice: Subject to any disclaimer, the term of this patent is extended or adjusted under 35 U.S.C. 154(b) by 86 days.

This patent is subject to a terminal disclaimer.

(21) Appl. No.: 16/366,414

(22) Filed: Mar. 27, 2019

(65) Prior Publication Data
US 2019/0392310 A1 Dec. 26, 2019

Related U.S. Application Data

(63) Continuation-in-part of application No. 16/017,402, filed on Jun. 25, 2018.

(51) Int. Cl.
*G06N 3/08* (2006.01)
*G06F 11/07* (2006.01)

(52) U.S. Cl.
CPC .......... *G06N 3/08* (2013.01); *G06F 11/0709* (2013.01); *G06F 11/0751* (2013.01); *G06F 11/0769* (2013.01); *G06F 11/0793* (2013.01)

(58) Field of Classification Search
CPC .............. G06F 11/079; G06F 11/0709; G06F 11/0751; G06F 11/008
See application file for complete search history.

(56) References Cited

U.S. PATENT DOCUMENTS

| 5,404,518 A | * | 4/1995 | Gilbertson | G06F 16/337 |
| 6,014,658 A | * | 1/2000 | Pretz | G06Q 30/02 |
| 6,742,141 B1 | * | 5/2004 | Miller | G06F 11/0748 |
| | | | | 706/45 |

(Continued)

OTHER PUBLICATIONS

Office Action in related/corresponding U.S. Appl. No. 16/017,402 dated Dec. 30, 2020.

(Continued)

*Primary Examiner* — Amine Riad
(74) *Attorney, Agent, or Firm* — Patent Portfolio Builders PLLC

(57) ABSTRACT

The present disclosure relates to system(s) and method(s) for generating a score for a runbook or a script. The system receives a ticket and a ticket description. The system further identifies a set of policies based on an analysis of historical data, the ticket and the ticket description. Further, the system determines a set of functions based on an analysis of the set of policies using a neural network technique and an Inverse Reinforcement Learning technique. Furthermore, the system recommends a runbook or a script based on the set of functions, the ticket and the ticket description. The runbook or the script is further executed to resolve the ticket. Based on the execution, the system records a script success or a script failure. The system further generates a score for the runbook or the script based on the script success or the script failure.

10 Claims, 7 Drawing Sheets

(56) References Cited

U.S. PATENT DOCUMENTS

| | | | | |
|---|---|---|---|---|
| 7,263,632 B2* | 8/2007 | Ritz | ................... | G06F 11/0709 |
| | | | | 714/25 |
| 8,010,840 B2* | 8/2011 | Chavez, Jr. | ......... | G06F 11/0769 |
| | | | | 714/26 |
| 8,065,145 B2* | 11/2011 | Okamoto | .............. | G06F 16/345 |
| | | | | 704/245 |
| 8,756,301 B2* | 6/2014 | Ennis | ...................... | H04L 41/00 |
| | | | | 709/223 |
| 9,075,802 B2* | 7/2015 | Davis | ..................... | G06F 16/93 |
| 9,098,408 B2* | 8/2015 | Mahindru | ............ | G06Q 10/103 |
| 9,189,317 B1* | 11/2015 | Marimuthu | ............... | G06F 8/70 |
| 10,282,248 B1* | 5/2019 | Gudka | ................ | G06F 11/0751 |
| 10,438,212 B1* | 10/2019 | Jilani | ................. | G06Q 30/0281 |
| 2004/0236843 A1* | 11/2004 | Wing | ...................... | H04L 67/34 |
| | | | | 709/219 |
| 2005/0120112 A1* | 6/2005 | Wing | ..................... | G06Q 10/06 |
| | | | | 709/224 |
| 2009/0063387 A1* | 3/2009 | Beaty | ........................ | G06N 5/04 |
| | | | | 706/50 |
| 2014/0122514 A1 | 5/2014 | Bostick et al. | | |
| 2015/0074666 A1 | 3/2015 | Kunii et al. | | |
| 2017/0212756 A1* | 7/2017 | Ryali | ........................ | G06F 8/60 |
| 2020/0004618 A1 | 1/2020 | Thornhill et al. | | |
| 2020/0117531 A1 | 4/2020 | Sudharsana et al. | | |

OTHER PUBLICATIONS

Notice of Allowance in related/corresponding U.S. Appl. No. 16/017,402 dated May 29, 2020. (All references not cited herewith have been previously made of record.).

* cited by examiner

GENERATING A SCORE FOR A RUNBOOK OR A SCRIPT

CROSS-REFERENCE TO; RELATED APPLICATIONS AND PRIORITY

This application is a continuation-in-part application of U.S. patent application Ser. No. 16/017,402 filed on 25 Jun. 2018, the disclosure of which is herein incorporated by references.

TECHNICAL FIELD

The present disclosure in general relates to the field of resolving a hardware issue and a software issue. More particularly, the present invention relates to a system and method for generating a score for a runbook or script.

BACKGROUND

Generally, issues occurred in a software applications or IT infrastructure are resolved by Subject Matter Experts (SMEs) or human engineers. The SMEs resolve the issues, by executing one or more commands, based on their knowledge and a severity of issue. However, this process of resolving the issues take lot of time and require lot of human efforts. Further, some automation systems are available to reduce time required for resolving issues. The automation systems enable the SMEs to create a runbook or a script to resolve the issue. The runbook or the script is further stored in a repository. Once an issue is occurred, the automation systems recommend a set of runbooks or a set of scripts from the repository to resolve the issue. However, the set of runbooks or the set of scripts may not be able to resolve the issue.

SUMMARY

Before the present systems and methods for generating a score for a runbook or a script, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for generating the score for the runbook or the script. This summary is not intended to identify essential features of the claimed subject matter nor is it intended for use in determining or limiting the scope of the claimed subject matter.

In one implementation, a system for generating a score for one of a runbook or script is illustrated. The system comprises a memory and a processor coupled to the memory, further the processor is configured to execute programmed instructions stored in the memory. In one embodiment, the processor may execute programmed instructions stored in the memory for receiving ticket data. The ticket data may comprise a ticket, and a ticket description. Further, the processor may execute programmed instructions stored in the memory for identifying a set of policies associated with a platform. The set of policies may be identified based on an analysis of historical data, the ticket and the ticket description. The processor may execute programmed instructions stored in the memory for determining a set of functions based on an analysis of the set of policies. The set of policies may be analysed using a neural network and an Inverse Reinforcement Learning technique. Further, the processor may execute programmed instructions stored in the memory for recommending one of a runbook or a script from a runbook repository based on an analysis of the ticket and the ticket description. The ticket and the ticket description may be analysed using the set of functions. Furthermore, the processor may execute programmed instructions stored in the memory for executing the runbook or the script to resolve the ticket. The processor may further execute programmed instructions stored in the memory for recording one of a script success or a script failure based on the execution of the runbook or the script. The script success may be recorded when the runbook or the script resolve the ticket. The script failure may be recorded when the runbook or the script fails to resolve the ticket. Further, the processor may execute programmed instructions stored in the memory for generating a score associated with one of the runbook or the script based on one of the script success and the script failure.

In another implementation, a method for generating a score for one of a runbook or a script is illustrated. In one embodiment, the method may comprise receiving ticket data. The ticket data may comprise a ticket, and a ticket description. Further, the method may comprise identifying a set of policies associated with a platform. The set of policies may be identified based on an analysis of historical data, the ticket and the ticket description. The method may further comprise determining a set of functions based on an analysis of the set of policies. The set of policies may be analysed using a neural network technique and an Inverse Reinforcement Learning technique. Further, the method may comprise recommending a runbook or a script from a runbook repository based on an analysis of the ticket and the ticket description. The ticket and the ticket description may be analysed using the set of functions. Furthermore, the method may comprise executing the runbook or the script to resolve the ticket. The method may further comprise recording one of a script success or a script failure based on the execution of the runbook or the script. The script success may be recorded when the runbook or the script resolve the ticket. The script failure may be recorded when the runbook or the script fails to resolve the ticket. Further, the method may comprise generating a score associated with one of the runbook or the script based on one of the script success and the script failure.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "receiving", "identifying", "determining", "recommending", "executing", "recording", "generating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for generating a score for a runbook or a script are now described. The disclosed embodiments of the system and method for generating the score for assisting the user to resolve the hardware issue and the software issue are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for generating a score for a runbook or a script is not intended to be limited to the embodiments illustrated, but is to be accorded the widest scope consistent with the principles and features described herein.

The present subject matter relates to generating a score for a runbook or a script. In one embodiment, ticket data may be received. The ticket data may comprise a ticket and a ticket description. Once the ticket data is received, a set of policies associated with a platform may be identified. The set of policies may be identified based on an analysis of historical data, the ticket and the ticket description. Upon identification of the set of policies, a set of functions may be determined. The set of functions may be determined based on an analysis of the set of policies using a neural network technique and an Inverse Reinforcement Learning technique. The set of functions may be further used to analyse the ticket and the ticket description. Based on the analysis of the ticket and the ticket description, a runbook or a script may be recommended from a runbook repository. The runbook or the script may be executed to resolve the ticket. Upon execution of the runbook or the script, one of a script success or a script failure may be recorded. Further, a score for the runbook or the script may be generated based on one of the script success or the script failure.

Figure 1:
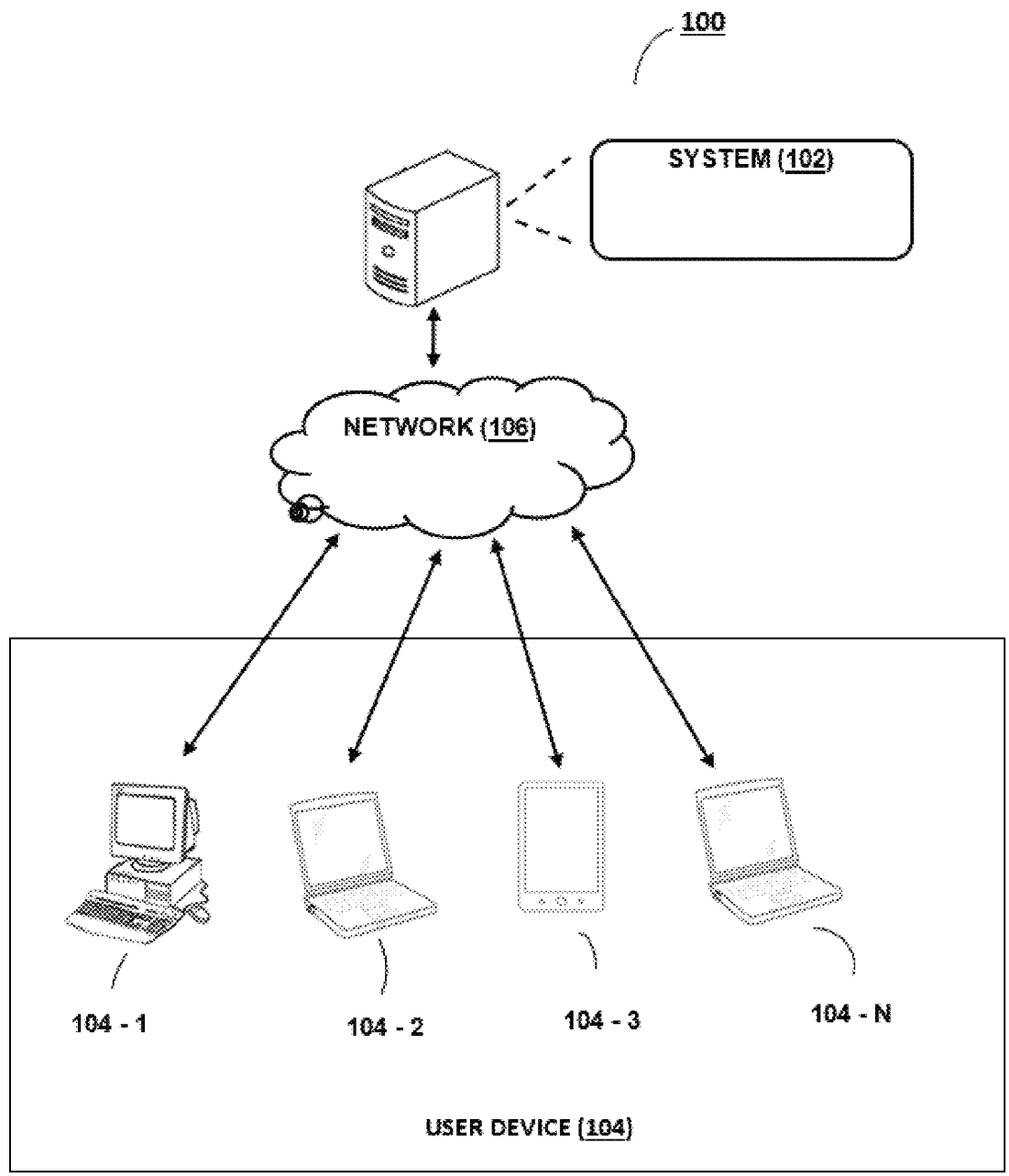
FIG. 1 illustrates a network implementation of a system for generating a score for a runbook or a script, in accordance with an embodiment of the present subject matter.

Referring now to FIG. 1, a network implementation 100 of a system 102 for generating a score for a runbook or a script is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be configured to receive ticket data. The ticket data may be received based on user inputs. The ticket data may comprise a ticket, a ticket description, a ticket cluster, a ticket category, a ticket subcategory, and the like. In one aspect, the ticket may be associated with a hardware issue or a software issue in a platform. The ticket description may correspond to a description of issue. The ticket cluster may correspond to a type of issue.

Further, the system 102 may identify a set of policies associated with the platform. In one aspect, the platform may be referred as an environment. The set of policies may be identified based on an analysis of historical data, the ticket and the ticket description. The historical data, the ticket and the ticket description may be analysed using a neural network technique and an Inverse Reinforcement Learning technique. The neural network technique may be one of a Convolution Neural Network (CNN) technique, a Deep Neural Network (DNN) technique, and a Recurrent Neural Network (RNN) technique.

In one embodiment, the historical data may be stored in a historical repository. The historical data may comprise a historic issue, a historic ticket, a historic ticket description, a historic ticket category, a historic ticket subcategory, platform data, and the like.

Once the set of policies is identified, the system 102 may determine a set of functions based on an analysis of the set of policies. The set of policies may be analysed using a neural network technique and an Inverse Reinforcement Learning technique. The neural network technique may be one of a Convolution Neural Network (CNN) technique, a Deep Neural Network (DNN) technique, and a Recurrent Neural Network (RNN) technique. The set of functions may be further analysed to identify a set of algorithms. The set of functions may be analysed using an Inverse Reinforcement Learning.

Upon determining the set of functions, the system 102 may recommend one of a runbook or a script from a runbook repository. The runbook repository may correspond to a runbook recommendation engine. The runbook or the script may be recommended based on an analysis of the ticket and the ticket description using the set of functions. In one aspect, the set of algorithms may be used to recommend the runbook or the script. The runbook may comprise a runbook name, a runbook tag, category and the like. The script may comprise a script name, a script tag, a script category and the like.

Further, the system 102 may execute the runbook or the script. The runbook or the script may be executed to resolve the ticket. Based on the execution, the system 102 may record one of a script success or a script failure. The script success may be recorded when the runbook or the script resolves the ticket. The script failure may be recorded when the runbook or the script fails to resolve the ticket.

Based on the script success and the script failure, the system 102 may generate a score for one of the runbook or the script. The score associated with the runbook or the script may be stored in the runbook repository. The score may be changed based on the script success and the script failure. In one aspect, the score may be boosted based on the script success. The score may be penalized based on the script failure. In other words, the score of the runbook or the script may be increased or decreased based on the script success and the script failure.

In one embodiment, the system 102 may implement an entity model. The entity model may be implemented based on an ontology of a domain. In one aspect, the ontology based entity model may penalize the score of the runbook or the script. The score may be penalized or boosted based on a number of key parameters matched between the issue and the runbook or the script.

In one embodiment, the system 102 may use a transfer learning technique to use a knowledge from the platform that is built upon over period of time. The knowledge may correspond to a parameter value or a hyperparameter value associated with the platform. The parameter value or the hyperparameter value may be an initial value for building new runbook recommendation engine in any other platform. This may avoid building the runbook recommendation engine from scratch in a new platform. In other words, the system 102 may use existing runbook recommendation engine from a previous platform to the new environment with modification associated with the new environment to avoid building model from scratch.

Further, construe the runbook recommendation engine exposed to the new platform. In this case, the system 102 may use a Reinforcement Learning technique to penalize by deduction of the score. The score referred to as reward points, hereinafter, may be deducted for each incorrect resolution step of the runbook or the script, or if the runbook or the script corresponding to the issue failed to run. The system 102 may learn itself based on its experience without involvement of human experts. In other words, the system 102 may be smart enough to find, create, or update the runbook or the script based on knowledge extracted from multiple sources and based on the experience in the platform environment. In one example, construe an issue "High CPU Load". In this case, the system 102 may find, create, or update the runbook or the script using a repetitive process of penalty and the reward points.

In another embodiment, the system 102 may utilize historical data comprising detailed description of issues, events and actions taken by a support person. In this case, the action comprises execution of the runbook or the script from the runbook recommendation engine. The system 102 may use the historical data to penalize or boost the score of the runbook or the script. The system 102 may use an Inverse Reinforcement Learning (IRL) technique to find a combination of algorithms that can be used as core algorithm in the runbook recommendation engine to recommend the runbook or the script. Further, the system 102 may recommend one or more algorithms. The system 102 may determine one or more hyperparameter values associated with the one or more algorithms using the Reinforcement Learning technique. The one or more hyperparameter values may be used to validate the historical data from existing environment. It is to be noted that, the process may be known as hyperparameter tuning. In other words, the system 102 may select the one or more algorithms that may recommend best runbook recommendation engine as per the historical data.

Figure 2:
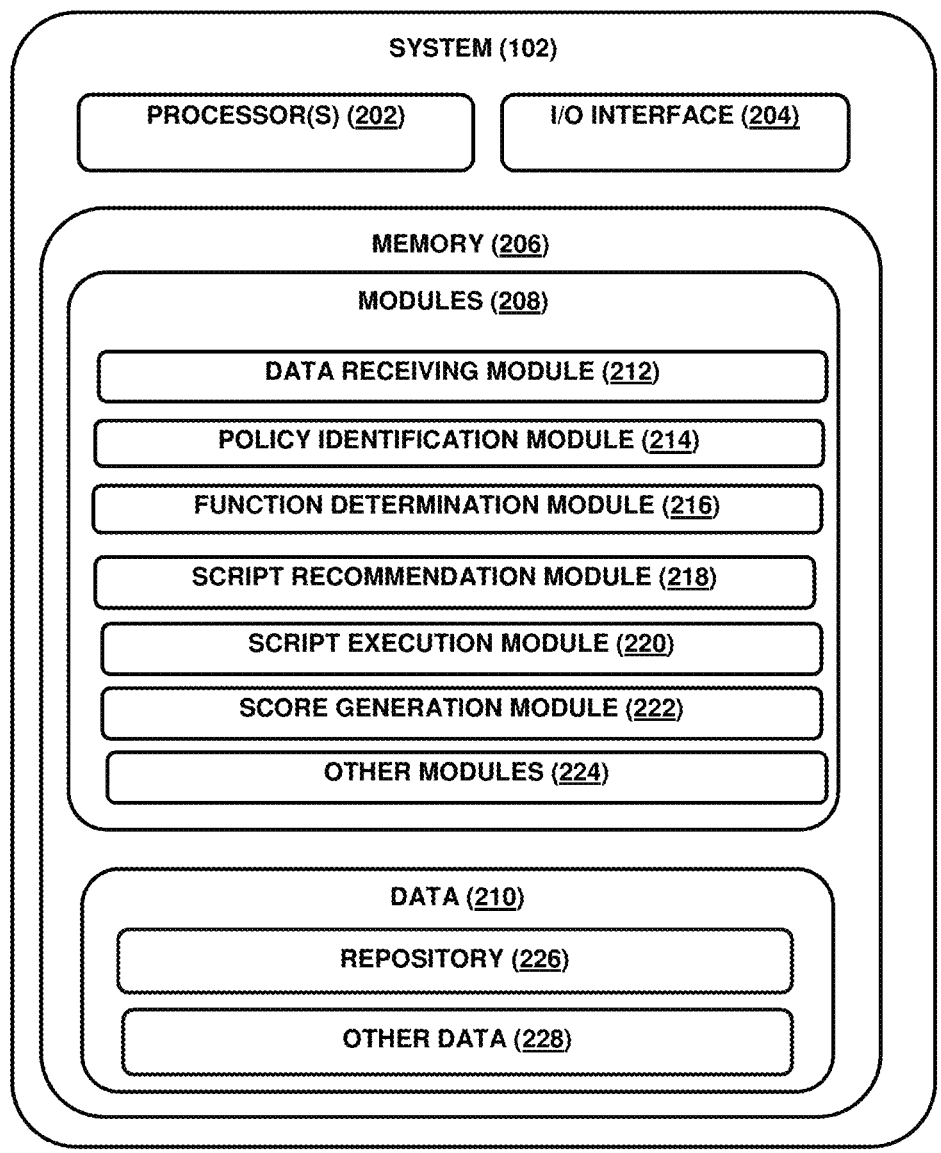
FIG. 2 illustrates the system for generating the score for the runbook or the script, in accordance with an embodiment of the present subject matter.

Referring now to FIG. 2, the system 102 for generating a score for a runbook or a script is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include data receiving module 212, a policy identification module 214, a function determination module 216, a script recommendation module 218, a script execution module 220, a score generation module 222, and other modules 224. The other modules 224 may include programs or coded instructions that supplement applications and functions of the system 102.

The data 210, amongst other things, serve as a repository for storing data processed, received, and generated by one or more of the modules 208. The data 210 may also include a repository 226, and other data 228. In one embodiment, the other data 228 may include data generated as a result of the execution of one or more modules in the other modules 224.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the data receiving module 212 may receive ticket data. The ticket data may be received based on user inputs. The ticket data may comprise a ticket, a ticket description, a ticket cluster, a ticket category, a ticket subcategory and the like. The ticket may be associated with one of a hardware issue or a software issue. The hardware issue or the software issue may be associated with a platform. The ticket description may be a description of the issue. The ticket cluster may be an issue type. Once the ticket data is received, the ticket data may be stored in the repository 226.

In one exemplary embodiment, construes ticket descriptions "High CPU utilization server A with threshold value 80%" and "High load on server B have threshold value 90%". In this case, the ticket cluster may correspond to "High CPU utilization".

Once the ticket data is received, the policy identification module 214 may identify a set of policies. The set of policies may be associated with the platform. The set of policies may be identified based on an analysis of the ticket, the ticket description and historical data. The historical data, the ticket and the ticket description may be analysed using a neural network technique and an Inverse Reinforcement Learning technique. The neural network technique may be one of a Convolution Neural Network (CNN) technique, a Deep Neural Network (DNN) technique, and a Recurrent Neural Network (RNN) technique.

In one embodiment, the historical data may comprise a historic ticket, a historic ticket description, historic ticket category, platform data, an action taken to resolve the historic ticket, and the like. The set of policies may be identified based on an analysis of the action taken to resolve the issue associated with the ticket.

Upon identifying the set of policies, the function determination module 216 may determine a set of functions. The set of functions may be determined based on an analysis of the set of policies. The set of policies may be analysed using a neural network technique and the Inverse Reinforcement Learning technique. The neural network technique may be one of a Convolution Neural Network (CNN) technique, a Deep Neural Network (DNN) technique, and a Recurrent Neural Network (RNN) technique.

In one aspect, each function from the set of functions may correspond to a reward function. The function determination module 216 may further identify a set of algorithms. The set of algorithms may be identified based on an analysis of the set of functions using the Inverse Reinforcement Learning technique.

Once the set of algorithms is identified, a hyperparameter value for one or more algorithms from the set of algorithms may be determined. In one aspect, the hyperparameter value may be determined based on a Reinforcement Learning technique. The hyperparameter value may be validated based on an analysis of the historical data. In one aspect, the hyperparameter value may be tuned based on the historical data. Based on the hyperparameter value, a subset of algorithms from the set of algorithms may be identified.

Further, the script recommendation module 218 may recommend one of a runbook or a script from a runbook repository. The runbook repository may be referred as a runbook recommendation engine. The runbook or the script may be recommended based on an analysis of the ticket and the ticket description. The ticket and the ticket description may be analysed using the set of functions. In one aspect, the script recommendation module 218 may use the subset of algorithms to recommend the runbook or the script. The runbook may comprise a runbook name, a runbook tag, a runbook description, category and the like. The script may comprise a script name, a script tag, a script description, a script category and the like. The runbook or the script may correspond to a solution used to resolve the issue associated with ticket. The runbook or the script may be in one of a programming language from C language, C++ language, Java and the like. In one embodiment, the runbook recommendation engine may use an artificial intelligence or a natural language processing to recommend the runbook or the script.

Upon recommendation of the runbook or the script, the script execution module 218 may execute the runbook or the script. The runbook or the script may be executed to resolve the issue associated with the ticket. Based on the execution of the runbook or the script, the script execution module 218 may record a script success and a scripts failure. In one embodiment, if the runbook or the script resolves the issue, then the script success may be recorded. If the runbook or the script fails to resolve the issue, then the script failure may be recorded.

Once the script success and the script failure is recorded, the score generation module 220 may generate a score for one of the runbook or the script. The score may correspond to a recommendation score of the runbook or the script. The score for the runbook or the script may be changed based on the script success and the script failure. In one embodiment, the score generation module 220 may boost the score of the runbook or the script based on the script success. In another embodiment, the score generation module 220 may penalise the score of the runbook or the script based on the script failure. In other words, the score of the runbook or the script may be increased or decreased based on the script success and the script failure.

In one embodiment, the score may be penalized or boosted based on a number of key parameters matched between the issue and the runbook or the script. In one exemplary embodiment, construe an alert as "CPU utilization is very high". The runbook and the score of the runbook may be "Memory Utilization", 0.87 and "CPU Utilization", 0.80. It is to be noted that the issue is related to CPU and not to memory. Henceforth, the system 102 should recommend "CPU Utilization" runbook instead of "Memory Utilization" on top. Here, the recommendation engine may penalize the score for "Memory Utilization" and boost the score for "CPU Utilization". This is because, the "CPU" is key parameter which is present in "CPU Utilization" runbook meta-data instead of "Memory Utilization".

In one embodiment, the score generation module 220 may update the score of the runbook or the script based on a feedback. The updating of the score may correspond to penalize or boost the score. The feedback may be received from the user. The user may provide the feedback based on the execution of the runbook or the script. The feedback may be used to improve performance of the runbook recommendation engine.

In one embodiment, the system 102 may generate a directed graph associated with a set of runbooks or a set of scripts. The directed graph may comprise a set of nodes and a set of edges. In one aspect, a relationship between the set of nodes may be created based on successful execution of each step of the runbook or the script. In the directed graph, each node may represent an operation to be performed and each edge may represent relationship between the nodes. The nodes may be spawned if an output from a previous operation satisfies condition to reach to other node.

The directed graphs may be generated dynamically using a Reinforcement Learning technique. In one aspect, during training, the system 102 may receive a reward or a penalty for each steps. The system 102 may learn optimal steps which needs to be followed for successful resolution of an issue or alert. The system 102 may execute runbooks or scripts for resolution using the directed graph based approach. During training, the directed graph may be generated based on the historical data. The historical data may comprise runbooks or scripts executed by a support person to resolve the issue associated with the ticket.

Exemplary embodiments discussed above may provide certain advantages. Though not required to practice aspects of the disclosure, these advantages may include those provided by the following features.

Some embodiments of the system and the method is configured to use a transfer learning technique to build a runbook recommendation engine in a new platform.

Some embodiments of the system and the method is configured to improve performance of the runbook recommendation engine.

Some embodiments of the system and the method is configured to penalize or boost a recommendation score of a runbook or a script based on success and failure of the runbook script.

Figure 3:
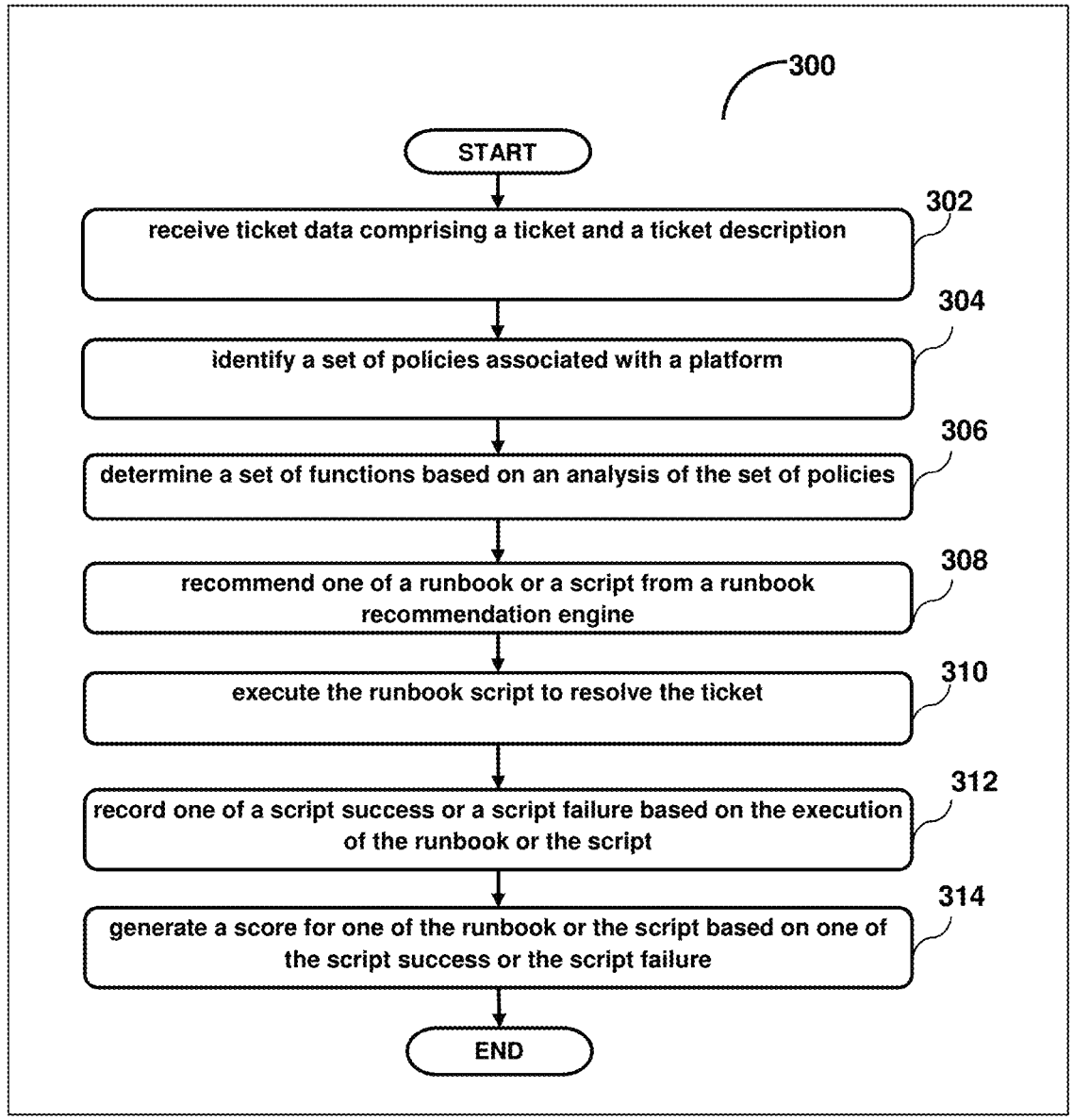
FIG. 3 illustrates a method for generating a score for the runbook or the script, in accordance with an embodiment of the present subject matter.

Referring now to FIG. 3, a method 300 for generating a score for a runbook or a script, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, ticket data may be received. In one implementation, the data receiving module 212 may receive the ticket data. The ticket data may comprise a ticket, a ticket description, a ticket cluster, a ticket category, a ticket sub-category and the like.

At block 304, a set of policies associated with a platform may be identified. In one implementation, the policy determination module 214 may identify the set of policies. The set of policies may be identified based on an analysis of historical data, the ticket and the ticket description. The historical data, the ticket and the ticket description may be analysed using a neural network technique and an Inverse Reinforcement Learning technique.

At block 306, a set of functions may be determined. In one implementation, the function determination module 216 may determine a set of functions. The set of functions may be based on an analysis of the set of policies using a neural network technique and an Inverse Reinforcement Learning technique.

At block 308, a runbook or a script may be recommended. In one implementation, the script recommendation module 218 may recommend the runbook or the script from a runbook repository. The runbook or the script may be recommended based on an analysis of the ticket and the ticket description using the set of functions.

At block 310, the runbook or the script may be executed. In one implementation, the script execution module 220 may execute the runbook or the script to resolve the ticket.

At block 312, a script success or a script failure may be recorded. In one implementation, the script recommendation module 220 may record the script success or the script failure based on the execution of the runbook or the script. The script success may be recorded when the runbook or the script resolves the ticket. The script failure may be recorded when the runbook or the script fails to resolve the ticket.

At block 314, a score associated with the runbook or the script may be generated. In one implementation, the score generation module 222 may generate the score. The score may be generated based on one of the script success or the script failure. The score may be changed based on the script success and the script failure.

Figure 4:
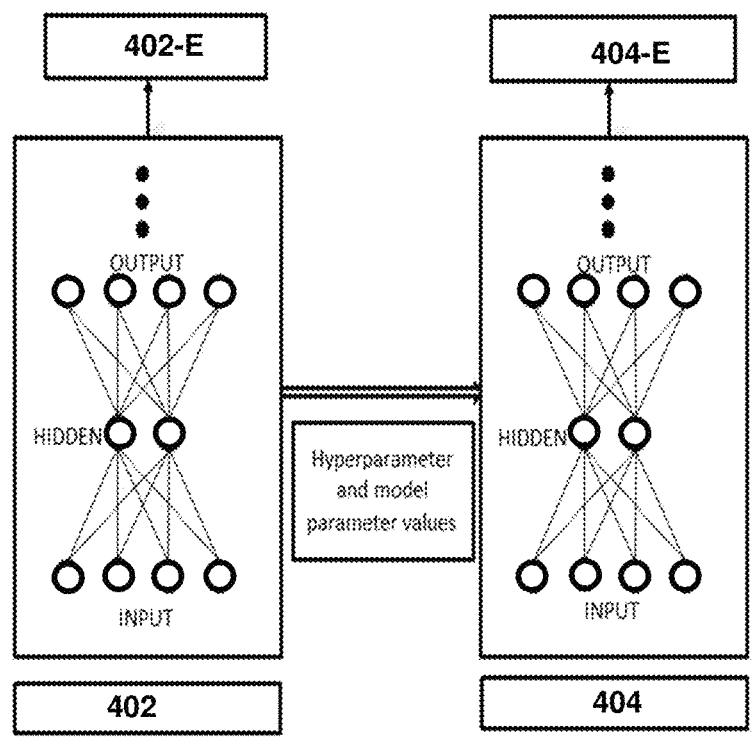
FIG. 4 illustrates a system for building a runbook recommendation engine over a new platform, in accordance with an embodiment of the present subject matter.

Referring now to FIG. 4, a system for building a runbook recommendation engine over a new platform, is illustrated in accordance with an embodiment of the present subject matter. In one embodiment, the system 102 may use a transfer learning technique to use a knowledge from an old platform 402 that is built upon over period of time. The knowledge may correspond to a parameter value or a hyperparameter value associated with the old platform 402. In one aspect, the parameter value or the hyperparameter value associated with a runbook recommendation engine 402-E. The parameter value or the hyperparameter value may be as initial value for building a new runbook recommendation engine 404-E in the new platform 404. This may avoid building the runbook recommendation engine from scratch in a new platform 404. In other words, the system 102 may use existing runbook recommendation engine 402-E from the old platform 402 to the new platform 404 with modification associated with the new platform 404 to avoid building model from scratch.

Figure 5:
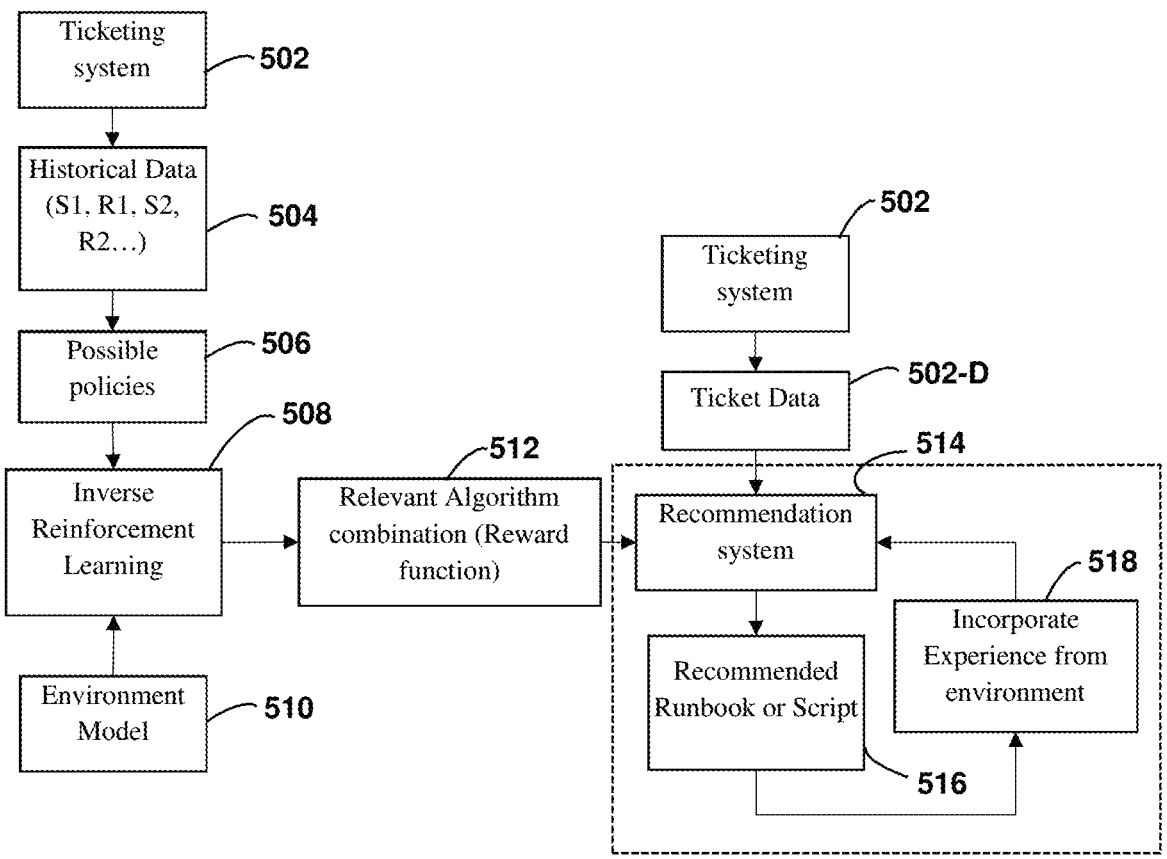
FIG. 5A illustrates a flowchart of a method for generating a score for a runbook or a script, in accordance with an embodiment of the present subject matter.
FIG. 5B illustrates generation of a score for the runbook or the script, in accordance with an embodiment of the present subject matter.
FIG. 5C illustrates generation of the score for the runbook or the script based on a user feedback, in accordance with an embodiment of the present subject matter.
Figure 5:
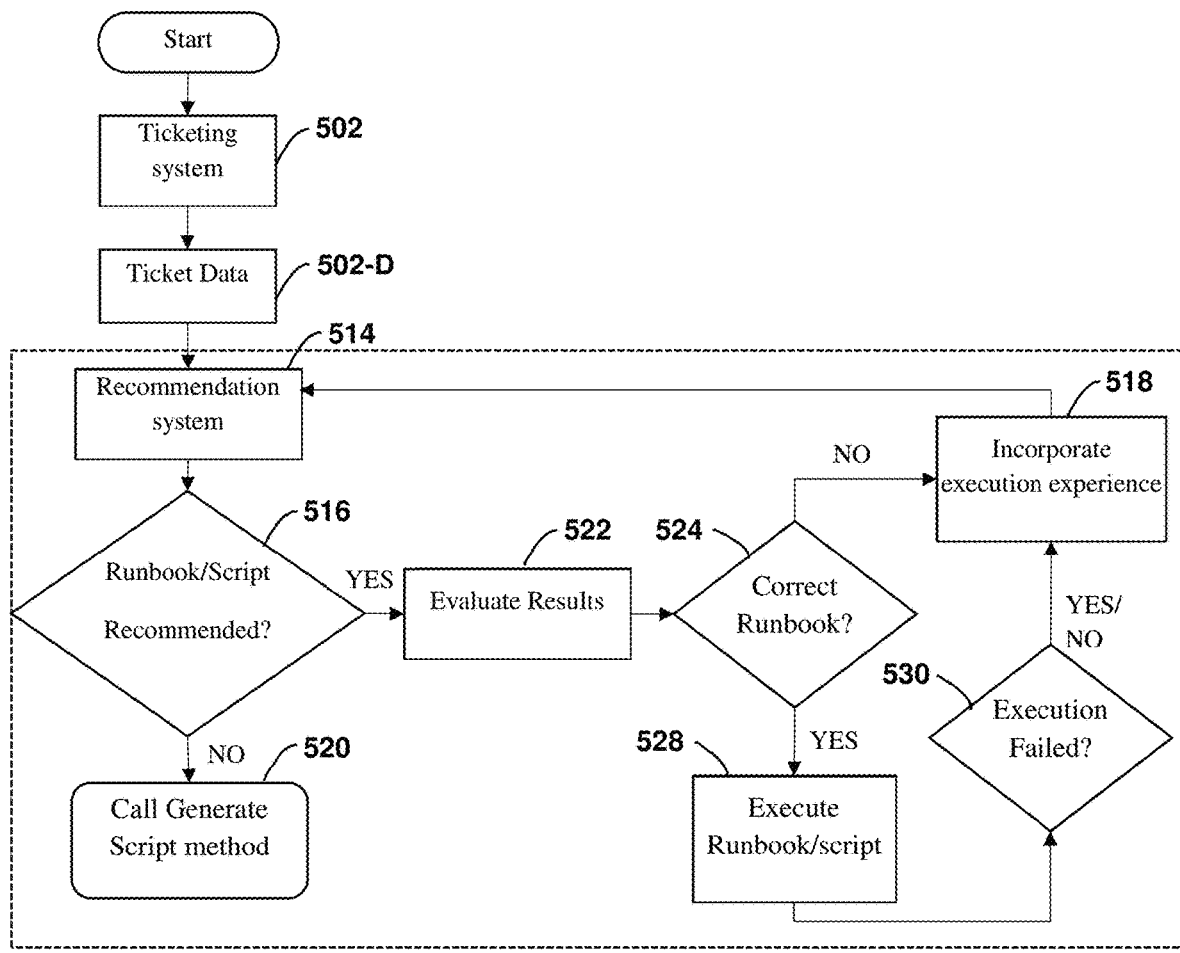
Figure 5:
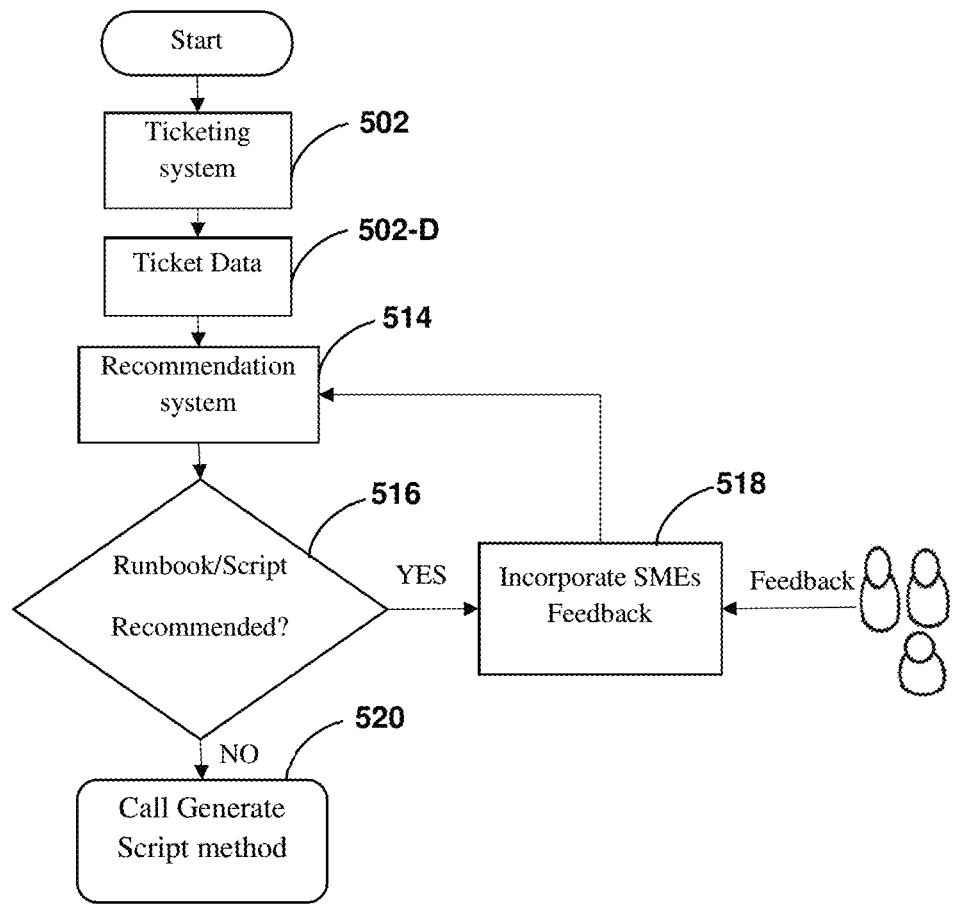

Referring now to FIG. 5A, a flowchart of a method for generating a score for a runbook or a script, is illustrated in accordance with an embodiment of the present subject matter. In one embodiment, the method may be considered to be implemented in the above described system 102. Referring now to FIG. 5B, generation of the score for the runbook or the script, illustrated in accordance with an embodiment of the present subject matter. Referring now to FIG. 5C, generation of the score for the runbook or the script based on a user feedback, is illustrated in accordance with an embodiment of the present subject matter. Further, FIG. 5A, FIG. 5B, and FIG. 5C are illustrated together.

At block 502, ticket data may be received. In one implementation, the system 102 may be configured to receive the ticket data 502-D. The ticket data 502-D may comprise a ticket, a ticket description, a ticket cluster, a ticket category, a ticket subcategory, and the like. In one aspect, the ticket may be associated with an issue in a platform.

At block 506, a set of policies may be identified. In one implementation, the system 102 may identify the set of policies associated with the platform. The set of policies may be identified based on an analysis of historical data, the ticket and the ticket description. The historical data, the ticket and the ticket description may be analysed using a neural network technique and an Inverse Reinforcement Learning technique. In one embodiment, the historical data may be stored in a historical repository 504. The historical data may comprise a historic issue, a historic ticket, a historic ticket description, a historic ticket category, a historic ticket subcategory, platform data, and the like.

At block 512, a set of functions may be determined based on an analysis of the set of policies. In one implementation, the system 102 may determine the set of functions. The set of policies may be analysed using a neural network technique and an Inverse Reinforcement Learning technique 508. The set of functions may be further analysed to identify a set of algorithms. The set of functions may be analysed using an Inverse Reinforcement Learning 508. The system 102 may analyse data associated with an environment model 510 using the Inverse Reinforcement Leaning 508 to identify the set of algorithms.

At block 514, a runbook recommendation engine may analyse the ticket data 502-D. Based on the analysis, the runbook recommendation engine may recommend a runbook or a script. The runbook recommendation engine may use the set of algorithms to recommend the runbook or the script. The runbook recommendation engine may be referred as a recommendation system. At block 516, the runbook or the script may be recommended.

At block 522, the runbook or the script may be evaluated. Further, at block 524, the system 102 may check if the runbook or the script is correct or not. The correctness of the runbook or the script may be checked based on an analysis of the runbook or the script.

At block 528, the runbook or the script may be executed. The runbook or the script may be executed to resolve the issue associated with the ticket. Based on the execution, the system 102 may record one of a script success or a script failure.

At block 530, the script success or the script failure may be recorded. be The script success may be recorded when the runbook or the script resolves the issue associated with ticket. The script failure may be recorded when the runbook or the script fails to resolve the issue associate with the ticket. Based on the script success and the script failure, the system 102 may generate a score for one of the runbook or the script. The score may be changed based on the script success and the script failure. In one aspect, the score may be boosted based on the script success. The score may be penalized based on the script failure.

At block 518, a user feedback may be incorporated in the recommendation system. The user feedback may be associated with the execution of the runbook or the script. Further, the user feedback, the runbook or the script, and the issue may be stored in the recommendation system.

At block 520, a new runbook or a new script may be generated. In one embodiment, if the recommendation system 514 fails to recommend the runbook or the script, then the system 102 may create the new runbook or the new script using a natural language processing.

Although implementations for systems and methods for generating a score for a runbook or a script have been described, it is to be understood that the appended claims are not necessarily limited to the specific features or methods described. Rather, the specific features and methods are disclosed as examples of implementations for generating the score for the runbook or the script.

We claim:

1. A system for generating a score for one of a runbook or a script, the system comprising:
   a memory;
   a processor coupled to the memory, wherein the processor is configured to execute programmed instructions stored in the memory to:
   receive ticket data, wherein the ticket data comprises a ticket, and a ticket description;
   identify a set of policies associated with a platform, wherein the set of policies is identified based on an analysis of historical data, the ticket and the ticket description;
   determine a set of functions based on an analysis of the set of policies, wherein the set of policies are analysed using a neural network technique and an Inverse Reinforcement Learning technique;
   recommend one of a runbook or a script from a runbook recommendation engine based on an analysis of the ticket and the ticket description, wherein the ticket and the ticket description are analysed using the set of functions;
   identify a set of hyperparameter values associated with the platform, wherein the set of hyperparameter values is further used to implement the runbook recommendation engine over a new platform, and wherein a transfer learning technique is used for the implementation of the runbook recommendation engine;
   execute the runbook or the script to resolve the ticket;
   record one of a script success or a script failure based on the execution of the runbook or the script, wherein the script success is recorded when the runbook or the script resolves the ticket, and wherein the failure script is recorded when the runbook or the script fails to resolve the ticket; and
   generate a score associated with one of the runbook or the script, wherein the score is generated based on one of the script success or the script failure.

2. The system as claimed in claim 1, further configured to identify a set of algorithms based on an analysis of the set of functions and the historical data using the Inverse Reinforcement Learning technique, wherein the set of algorithms is used to recommend the runbook or the script.

3. The system as claimed in claim 1, wherein the historical data, the ticket and the ticket description are analysed using a neural network technique and the Inverse Reinforcement Learning technique.

4. The system as claimed in claim 1, further configured to penalize or boost the score in the runbook recommendation engine based on the script success and script failure.

5. The system as claimed in claim 1, further configured to update the score based on feedback received from a user upon execution of the runbook or the script.

6. A method to generate a score for one of a runbook or a script, the method comprises:
   receiving, by a processor, ticket data, wherein the ticket data comprises a ticket, and a ticket description;
   identifying, by the processor, a set of policies associated with a platform, wherein the set of policies is identified based on an analysis of historical data, the ticket and the ticket description;

determining, by the processor, a set of functions based on an analysis of the set of policies, wherein the set of policies are analysed using a neural network technique and an Inverse Reinforcement Learning technique;

recommending, by the processor, one of a runbook or a script from a runbook recommendation engine based on an analysis of the ticket and the ticket description, wherein the ticket and the ticket description are analysed using the set of functions;

identifying, by the processor, a set of hyperparameter values associated with the platform, wherein the set of hyperparameter values is further used to implement the runbook recommendation engine over a new platform, and wherein a transfer learning technique is used for the implementation of the runbook recommendation engine;

executing, by the processor, the runbook or the script to resolve the ticket;

recording, by the processor, one of a script success or a script failure based on the execution of the runbook or the script, wherein the script success is recorded when the runbook or the script resolves the ticket, and wherein the failure script is recorded when the runbook or the script fails to resolve the ticket; and generating, by the processor, a score associated with one of the runbook or the script, wherein the score is generated based on one of the script success or the script failure.

7. The method as claimed in claim 6, further comprises identifying a set of algorithms based on an analysis of the set of functions and the historical data using the Inverse Reinforcement Learning technique, wherein the set of algorithms is used to recommend the runbook or the script.

8. The method as claimed in claim 6, wherein the historical data, the ticket and the ticket description are analysed using a neural network technique and an Inverse Reinforcement Learning technique.

9. The method as claimed in claim 6, further comprises penalizing or boosting the score in the runbook recommendation engine based on the script success and script failure.

10. The method as claimed in claim 6, further comprises updating the score based on feedback received from a user upon execution of the runbook or the script.

* * * * *